May 19, 1970   J. A. ELFENBEIN ET AL   3,513,300
AIRCRAFT WEIGHT AND CENTER OF GRAVITY COMPUTER
Filed Aug. 23, 1967                                5 Sheets-Sheet 1

INVENTORS
JACK A. ELFENBEIN
MANFRED CARL MUELLER
BY
*Julius L. Rubinstein*
ATTORNEY May 19, 1970     J. A. ELFENBEIN ET AL     3,513,300
AIRCRAFT WEIGHT AND CENTER OF GRAVITY COMPUTER
Filed Aug. 23, 1967     5 Sheets-Sheet 2
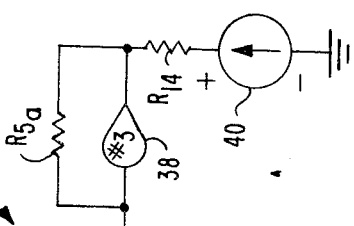
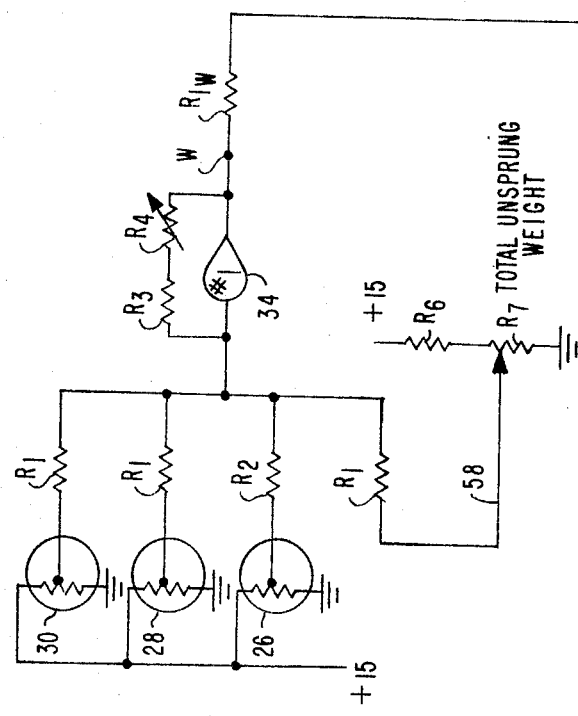
INVENTORS
JACK A. ELFENBEIN
BY   MANFRED CARL MUELLER
*Julius L. Rubinstein*
ATTORNEY

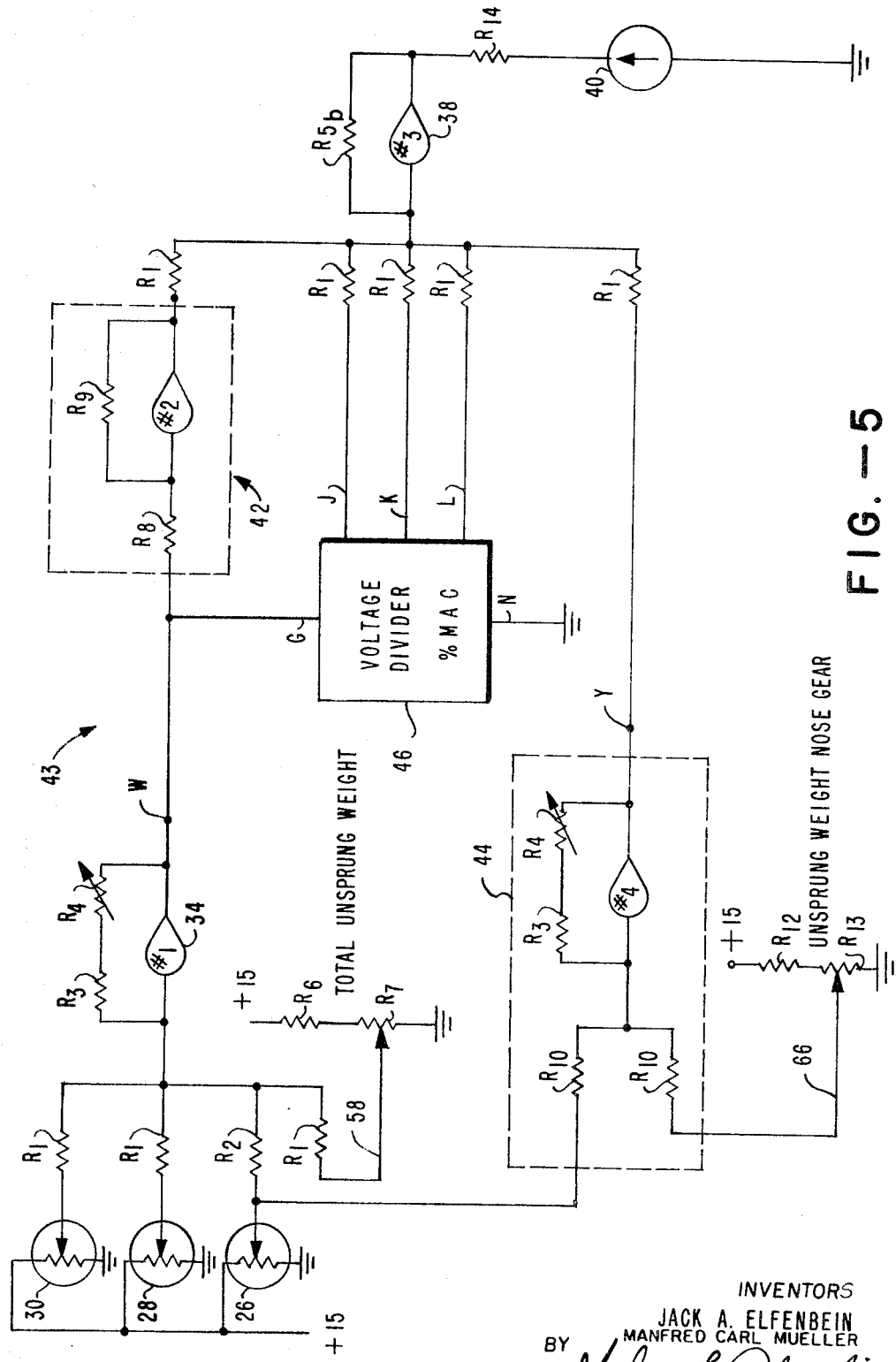

INVENTORS
JACK A. ELFENBEIN
MANFRED CARL MUELLER
BY
ATTORNEY

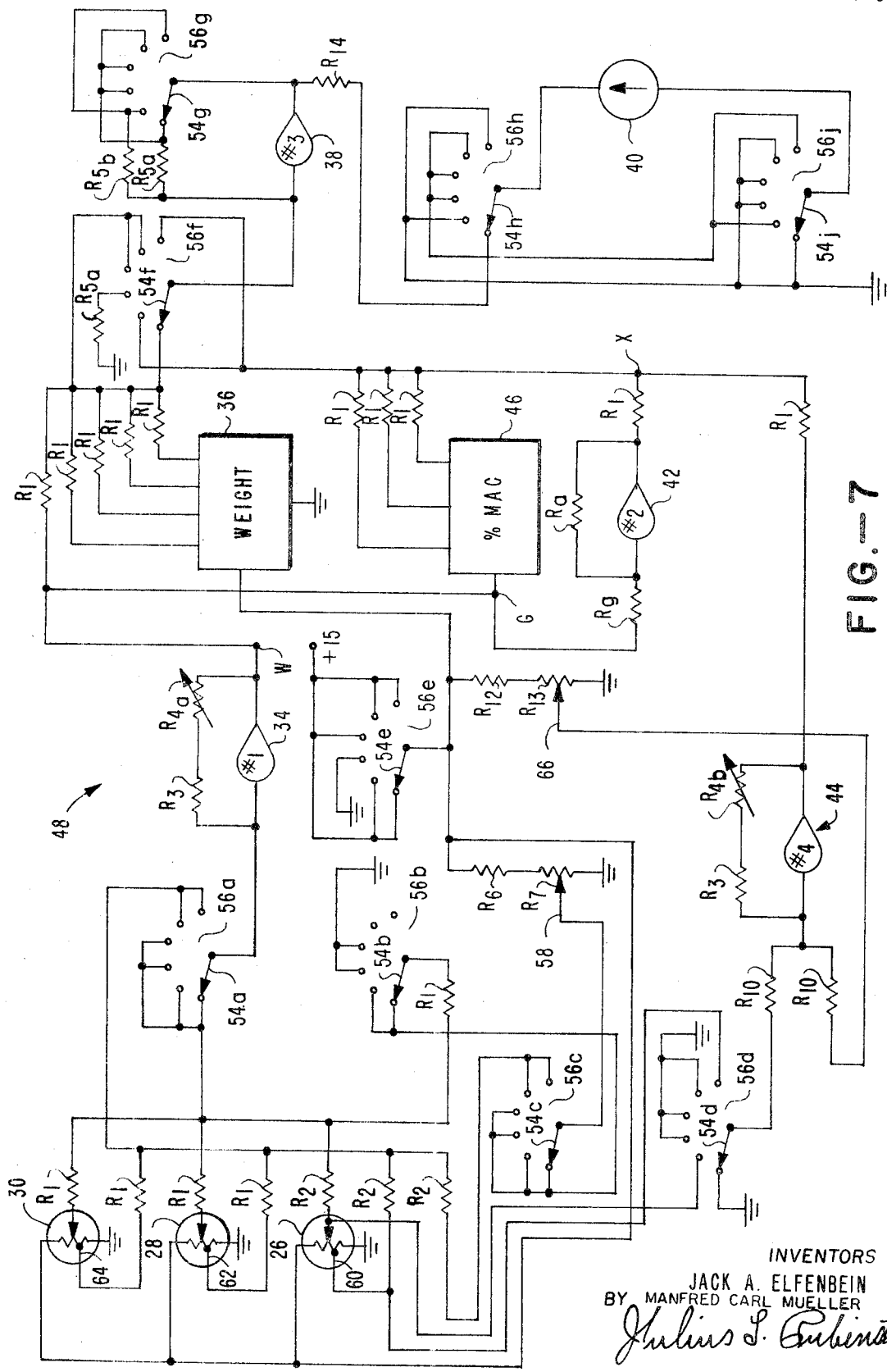

United States Patent Office 3,513,300
Patented May 19, 1970

1

3,513,300
AIRCRAFT WEIGHT AND CENTER OF
GRAVITY COMPUTER
Jack Asher Elfenbein, 260 Summit Ridge Drive, Beverly
Hills, Calif. 90210, and Manfred Carl Mueller, Los
Angeles, Calif.; said Mueller assignor to said Elfenbein.
Filed Aug. 23, 1967, Ser. No. 662,737
Int. Cl. G06f 7/12; G01m 1/12
U.S. Cl. 235—150.2                    10 Claims

ABSTRACT OF THE DISCLOSURE

This invention is characterized by the use of strain gauges mounted in the struts of the landing gear of an airplane. The strain gauges are connected to a computing circuit which can solve the problem $$A+B+C=0$$

where B and C represent known voltage characteristics of a particular airplane and A represents an adjustable voltage calibrated in terms of percent MAC. By adjusting the value of A until a null meter in a circuit indicates zero, a percent MAC can be directly determined. The adjustable voltage represented by the symbol A represents a three branch voltage divider which is calibrated in terms of percent MAC. Summing amplifiers are in the circuit to sum the voltage values of $A+B+C=0$.

---

This invention relates to a computing circuit and more particularly to a computing circuit for providing a direct indication of the center of gravity of an airplane in terms of percent MAC.

The importance of loading an airplane so its center of gravity falls between predetermined limits along the mean aerodynamic chord (MAC) is well known. Suffice it to say that if the airplane is loaded so the location of the center of gravity falls outside these limits, the airplane will not fly at all, or will not fly safely.

It is also desirable that a comprising circuit for making these measurements be self-contained in the airplane in the event the airplane must be reloaded on airfields which do not have other means for providing this information. What is needed, therefore, and comprises an important object of this invention, is to provide a self-contained direct reading apparatus for precisely locating the position of the center of gravity of the airplane in terms of percent MAC.

This and other objects of this invention will become more apparent when better understood in the light of the specifications and accompanying drawings, wherein:

FIG. 3 shows the weight measuring circuit portion of the computer circuit.

FIG. 4 shows the weight variable voltage divider used in the weight measuring portion of the computer circuit.

FIG. 5 shows the portion of the computer circuit which measures the center of gravity in terms of percent MAC.

FIG. 7 shows a complete computer circuit with the switching element used to produce the circuit shown in FIG. 3 and FIG. 5.

2

Figure 8:
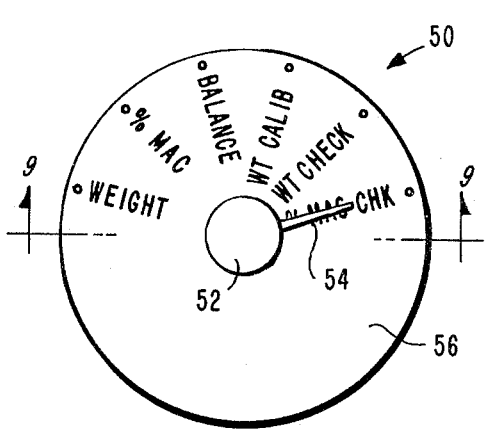

FIG. 8 shows the six positions of the 9 stack 6 position switch.

Figure 9:
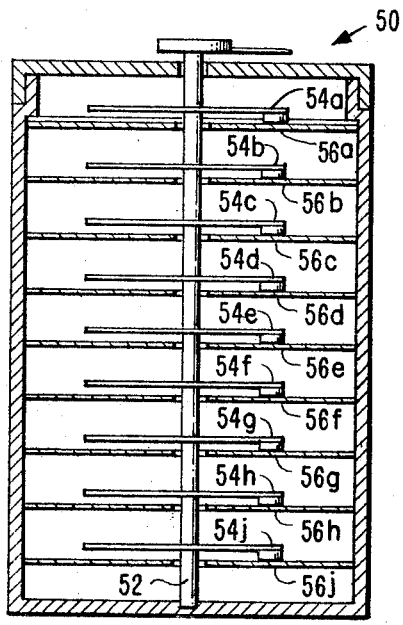

FIG. 9 shows a side elevational view of the 9 stack 6 position switch.

Figure 1:
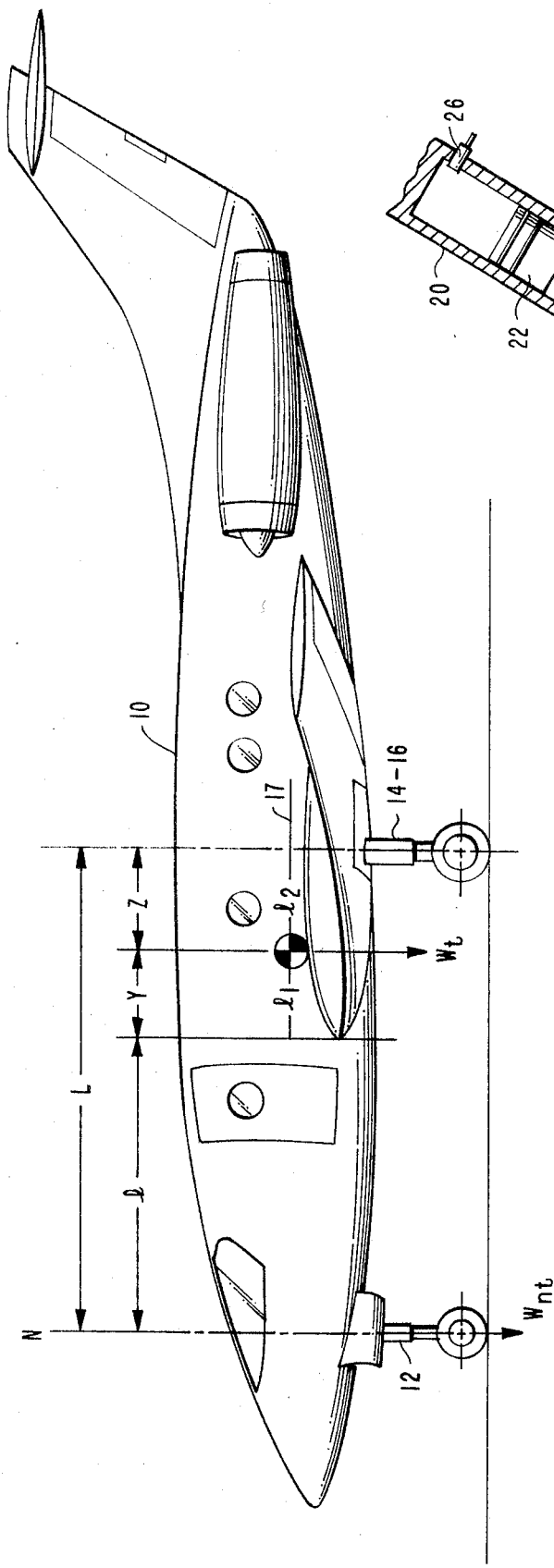
FIG. 1 is a side view of an airplane in which the self-contained computer is mounted, showing diagrammatically the location of the mean aerodynamic chord and the center of gravity of the airplane, in relation to the landing gear of the airplane.

Referring now to FIG. 1 of the drawing, an airplane indicated generally by the reference numeral 10 is, in this particular embodiment, provided with a tricycle landing gear. The tricycle landing gear includes a nose landing gear 12 and port and starboard landing gears 14 and 16. It is, however, to be understood that the principles of this invention are equally applicable to airplanes with a rear landing wheel or skid instead of a nose landing gear.

As shown in FIG. 1 the separation between the nose landing gear and the port and starboard landing gear is a distance L. The total weight of the airplane is indicated by the symbol $W_t$. The center of gravity is a distance Z measured from a reference point, which in this case is chosen as the axis of the port and starboard wheels. The mean aerodynamic chord 17, hereafter referred to as MAC, is shown as a straight line 17 on the longitudinal axis of the airplane and has a length designated as MAC. The distance between the nose landing gear and the leading edge of the MAC is designated as $l$, and the distance from the leading edge of the MAC and the center of gravity is designated as $y$. The limits along the MAC in which the center of gravity must fall in any loading configurations $l_1$ and $l_2$. $W_{nt}$ is the weight carried by the nose landing gear and includes the weight on the nose $W_n$ as well as its unsprung weight $W_{nus}$.

For equilibrium conditions taking the moments around the reference point $$W_{nt}L=W_t Z \qquad (1)$$

Rearranging Equation 1;

$$\frac{Z}{L}=\frac{W_{nt}}{W_t} \qquad (2)$$

By definition the percent $$MAC=\frac{y}{MAC}\times 100$$

The diagram in FIG. 1 shows:

$$L=l+y+z \qquad (3)$$

hence $$\frac{y}{MAC}=\frac{L-l-Z}{MAC}=\frac{L}{MAC}-\frac{l}{MAC}-\frac{z}{MAC} \qquad (4)$$

Rearranging Equation 4;

$$\frac{y}{MAC}=\frac{L}{MAC}\left(1-\frac{l}{L}\right)-\frac{L}{MAC}\frac{Z}{L} \qquad (5)$$

and from (2)

$$\frac{y}{MAC}=\frac{L}{MAC}\left(1-\frac{l}{L}\right)-\frac{L}{MAC}\frac{W_{nt}}{W_t} \qquad (6)$$

multiplying through by $W_t$ $$\frac{yW_t}{MAC}=\frac{LW_t}{MAC}\left(1-\frac{l}{L}\right)-\frac{L}{MAC}(W_{nt}) \qquad (7)$$

and transposing $$\frac{yW_t}{MAC}-\frac{LW_t}{MAC}\left(1-\frac{l}{L}\right)+\frac{L}{MAC}(W_{nt})=0 \qquad (8)$$

Equation 8 permits the percent MAC to be determined if the total weight of the airplane $W_t$ and the weight carried by the nose landing gear plus its unsprung weight $W_{nt}$ is known. This is because regardless of the loading configuration of a particular airplane, L, $l$ and MAC are known constants.

Figure 2:
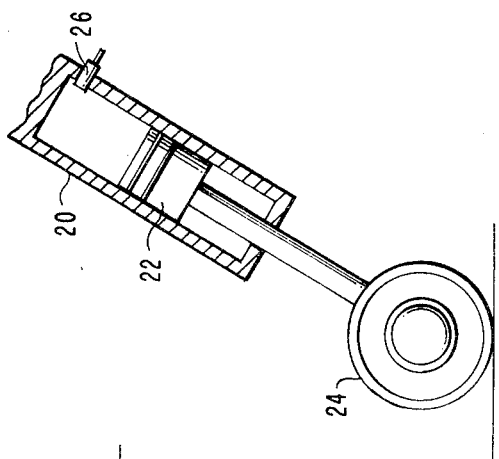
FIG. 2 is a side sectional view of a strut showing a pressure transducer mounted in the strut cylinder.

To solve Equation 8 in a self-contained apparatus mounted in an airplane, each landing gear contains a strut cylinder 20, a piston 22, and a wheel 24. As shown by way of example in FIGS. 2 and 3, pressure transducers 26, 28 and 30 are mounted in the nose and the port and starboard strut cylinders respectively. These transducers may be of the strain gage bridge variety and they produce a voltage output which is proportional to the pressure in the strut cylinder. This pressure is itself proportional to the weight carried by the strut cylinder so that the voltage output of these transducers is proportional to the weight carried by the respective landing gears. In addition, it is apparent that the sum of the voltage outputs from these transducers is proportional to the total weight of the airplane which is one of the factors needed to solve Equation 8. In addition, the voltage output of the nose transducer 26 is proportional to the weight $W_{nt}$ carried by the front cylinder, and is another factor required by Equation 8. When these factors are inserted in Equation 8 along with the values for $l$, $L$ and MAC of the airplane, it is apparent that the percent MAC can be computed. A self-contained direct measurement of the weight is important, however, because it is important to know the exact weight of the airplane before take off to make certain the airplane is not overloaded at take off and to get a better estimate of the fuel consumption.

The weighing circuit shown in FIG. 3, indicated generally by the reference numeral 32, is a portion of the complete computer circuit described below. This circuit takes the voltage outputs from the nose transducer 26 and the port and starboard transducers 28 and 30, and feeds them into a first summing amplifier 34. The negative voltage output from the summing amplifier 34 at point W in the circuit is the summation of the voltage output from all the transducers plus an additional voltage factor from resistors $R_6$ and $R_7$ which correspond to the total unsprung weight on the landing gears. Consequently, the output of the summing amplifier 34 is a voltage proportional to the total weight carried by the airplane.

An incremental voltage divider 36 is provided, see FIG. 3 and FIG. 4. The input to the incremental voltage divider is selected so its output is opposite in phase to the output of summing amplifier 34. In the embodiment shown a 15 volt positive input is selected. As seen, the voltage divider 36 comprises four branches or sets of resistances in parallel to each other. The maximum take off weight is also known because that is a fixed characteristic of the airplane. Consequently, the particular voltage at terminal W corresponding to the maximum take off weight is also known. It is clear that the input voltage to the incremental voltage divider 36 can be no less than this particular voltage and this is one of the limiting factors in selecting the input voltage to the incremental voltage divider. The fifteen volt input described above is somewhat greater than the maximum take off voltage that would ever appear at point W in the circuit.

The output of voltage divider 36 must be added to the voltage output of summing amplifier 34 at the input to summing amplifier 38. Since the output from the voltage divider is opposite in phase to the output of amplifier 34, when the output voltage from the summing amplifier 36 is equal in magnitude to the output of the voltage divider 36, the output of the summing amplifier 38 would be zero and this would be indicated on the null meter 40.

Consequently, the voltage divider 36 must be both adjustable and calibrated because when the setting on the voltage divider 36 produces a null indication on meter 40 the total weight of the airplane must be readable on the calibrations on the voltage divider.

To make these readings easy and accurate, the voltage divider 36 is divided into four branches designated as A, B, C and D respectively. In the particular embodiment shown, each branch comprises a plurality of resistances totaling 20,000 ohms each, which are connected between +15 volts and ground. In addition, each branch has a correspondingly lettered slider movable between the taps of the series connected resistances. Each tap in Branch D is designed to measure increments of 100 pounds of weight. Each tap in Branch C is designed to measure increments of 1,000 pounds. Each tap in Branch B is designed to indicate increments of 10,000 pounds, and each tap in Branch A indicates increments of 100,000 pounds of weight. Since the total permissible maximum weight of the airplane is known from airplane design considerations, the resistances $R_a$, $R_b$, $R_c$ and $R_d$ and the resistances between the taps in the respective branches may be determined using a simple application of Ohm's law. These resistances are chosen so the resistances measured by the taps correspond to the requirements of each branch of the voltage divider.

In use, the various taps of the voltage divider are adjusted so they produce a null indication on the meter 40, and the weight is read directly on the voltage divider 36. Specifically, the positions of the taps shown in FIG. 4 of the drawing indicate a total weight of 100,000 pounds in Branch A, 30,000 pounds in Branch B, 5,000 pounds in Branch C, and 800 pounds in Branch D. The voltages proportional to these resistances are summed in amplifier 38 and indicate a total weight of 135,800 pounds.

The portion of the computer circuit shown in FIG. 5 and indicated by the reference numeral 43 relates to means for directly indicating the center of gravity of the airplane in terms of the percent MAC. In this circuit, the voltage output of the pressure transducers 26, 28 and 30 corresponding to the weight carried by the landing gears, is fed into summing amplifier 34, along with a voltage from resistances $R_6$ and $R_7$, corresponding to the unsprung weight of the airplane. The output from the summing amplifier 34 at point W in the circuit 43 is a voltage proportional to the total weight of the airplane $W_t$.

Referring to Equation 8, it is seen that one of the factors which must be determined is $$\frac{-L}{MAC}\left(1-\frac{l}{L}\right)W_t \qquad (9)$$

If the voltage proportional to $W_t$ serves as an input to amplifier 42, then the output voltage of amplifier 42 would be proportional to $$\frac{-R_9}{R_8}W_t$$

Therefore, if resistances $R_9$ and $R_8$ are selected so $$\frac{R_9}{R_8}=\frac{+L}{MAC}\left(1-\frac{l}{L}\right) \qquad (10)$$

where all the factors on the right hand side of Equation 10 are known and fixed characteristics of a particular airplane, then the voltage at point X in the circuit will be proportional to $$\frac{-L}{MAC}\left(1-\frac{l}{L}\right)W_t \qquad (9)$$

The transducer in the nose strut sends out a voltage proportional to the weight carried by the strut. This voltage serves as one input to the summing amplifier 44. The other input to summing amplifier 44 comes from the series connected resistances $R_{12}$ and $R_{13}$ which produce a voltage proportional to the unsprung weight of the nose landing gear. With this arrangement the sum of the input voltages to amplifier 44 is proportional to $W_{nt}$, the total weight on the nose of the airplane. Consequently, the output of the summing amplifier 44 is a voltage proportional to the total weight on the nose of the airplane $W_{nt}$. Since we are dealing with a summing amplifier the output of summing amplifier 44 is also equal to $$\frac{(R_3+R_4)}{R_{10}}W_{nt}$$

From Equation 8 we want $$\frac{R_3+R_4}{R_{10}} \text{ to equal } \frac{L}{MAC} \qquad (11)$$

It is noted that the resistances $R_3$ and $R_4$ in summing amplifier 44 are the same as in summing amplifier 34 in FIG. 1 in order to minimize the number of different parts in the computing circuit shown in FIG. 7. This, of course, fixes the magnitude of resistance $R_{10}$ because as stated above $$\frac{R_3 + R_{4b}}{R_{10}} \text{ must equal } \frac{L}{MAC}$$

Consequently, the voltage at the output of amplifier 44 at point y of the circuit will be proportional to $$\frac{-L}{MAC}(W_{nt}) \tag{12}$$

The above is the second factor required in the solution of Equation 8.

To this point it can be seen that the percent MAC circuit shown in FIG. 5 produces two voltages, each proportional to the factors in Equation 8 described above.

The final factor to be determined, but which involves an unknown is the voltage proportional to $$\frac{y}{MAC} W_t \tag{13}$$

It will be recalled that the sum of all three factors in Equation 8 equals 0 and voltages proportional to two of the factors (9) and (12) present in Equation 8 are known. Furthermore, a voltage proportional to $W_t$ is at terminal W in circuit 43. Consequently, if this voltage is multiplied by an adjustable calibrated voltage divider 46 and this multiplied voltage is summed up with voltages representing the factors (9) and (12) in amplifier 38; then by adjusting the voltage divider until the null meter 40 indicates 0, the calibration on the voltage divider would equal $y/MAC$, which as stated above is the percent MAC.

Figure 6:
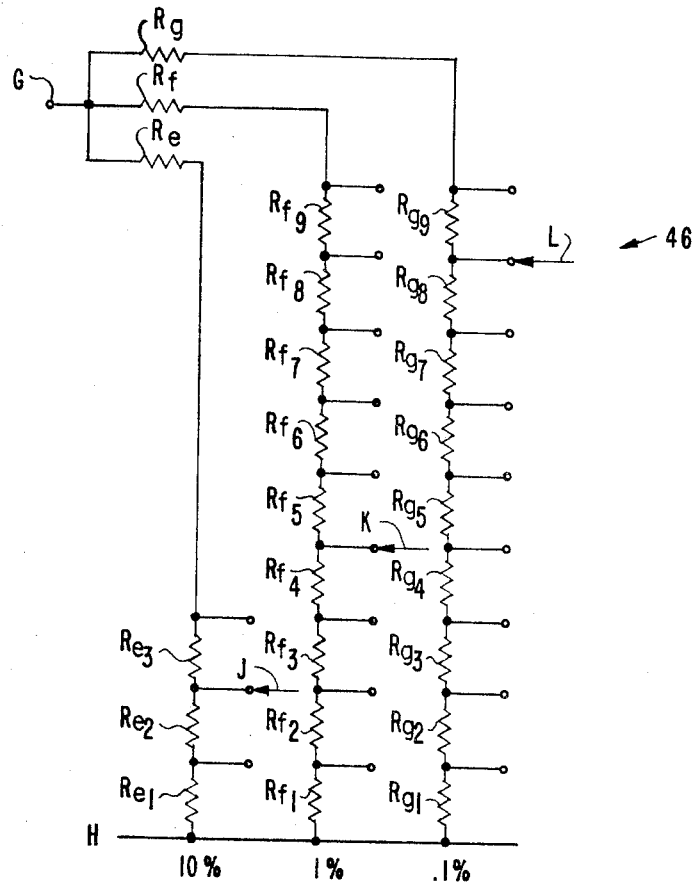
FIG. 6 shows the percent MAC variable voltage divider used with the portion of the circuit for directly measuring the percent MAC.

The percent MAC voltage divider shown in FIG. 6 operates in the following way. Practical consideration requires the percent MAC to be between the limits $l_1 + l_2$ which are 10 percent and 30 percent of the percent MAC as measured from the leading edge of the MAC for all conventionally designed airplanes. As seen, the voltage divider 46 comprises three branches, J, K, and L. The total resistances in each branch in the particular embodiment shown is 15K. Referring to Branch J, since as stated above, the percent MAC for all practical purposes must lie between 10 percent and 30 percent of the MAC, then the three taps shown should correspond to 10 percent each. It is evident that at termnal 3 we want 30 percent of the voltage at $G(W_t)$ and at terminal 2 we want 20 percent and at terminal 1 we want 10 percent. Consequently, it can be shown that $R_e$ must be 70 percent of the total branch resistance and $R_{e1}$ and $R_{e2}$ and $R_{e3}$ would be 10 percent each of the branch resistances.

Branch K has 9 taps ranging from 1 percent to 9 percent MAC while Branch L has 9 taps and ranges from .1 percent to .9 percent. The magnitudes of the resistances $R_f$ and $R_g$ as well as the remaining resistances in the various branches are calculated in the same way as the resistances in Branch J. As shown in FIG. 6, the voltage divider indicates a percent MAC of 24.8.

In use, the airplane shown in FIG. 1 is loaded. Then the sliders on the voltage divider 46 are adjusted until meter 40 indicates a null reading. Then the percent MAC is read directly on the voltage divider. If no null reading is obtainable by this instrument, it is an indication that the airplane is loaded incorrectly.

The complete circuit 48 shown in FIG. 7 is characterized by a 9 stack 6 position switch 50, see FIG. 8. As seen in FIG. 9 switch 50 comprises a central shaft 52. Nine rotary sliders 54a, 54b, 54c, 54d, 54e, 54f, 54g, 54h and 54j are attached to shaft 52 and rotate therewith. Each shaft rotates against an identical contact board 56. On each contact board are six contacts disposed on the arc of a circle and in position to be contacted by the above-described sliders. Each of the sliders has the same angular position with respect to shaft 52 and they each engage a corresponding contact at the same time.

In particular, as shown in FIG. 8, each of the contact boards 56a, 56b, 56c, 56d, 56e, 56f, 56g, 56h and 56j has 6 contact positions in angularly spaced relationship to each other. These contact positions, as shown in FIG. 8 are the weight position, the percent MAC position, the balance position, the weight calibration position, the weight check position and the percent MAC check position. As shown in FIG. 8, all nine sliders engage the weight contact position. In this position, the weight contact circuit 32 shown in FIG. 3 is produced. When the sliders are rotated to the contact identified as percent MAC, the circuit 43 shown in FIG. 5 is produced.

The contact identified as the balance position shown in FIG. 8 is for adjusting the summing amplifiers 34, 38, 42 and 44, so they have a zero voltage output when there is a zero voltage input. If this were not so, error would be introduced into the circuit. Consequently, a study of circuit 48 shows when the sliders are in the balance position there is a zero input at each of the above-described amplifiers. If this is done, then a voltage meter is applied to the output of each summing amplifier. Next the amplifiers may be adjusted internally by any suitable means to produce a zero output. It is noted that this internal adjustment of the amplifiers is done very infrequently and occurs usually during an overhaul.

The contact identified as weight calibration is for the purpose of adjusting slider 58 of the variable resistance $R_4$. This slider is in the feed back circuit of the amplifier 34 and represents the variable gain of a meter of amplifier 34. Initially this adjustment is made by weighing the entire airplane by some independent means. Since the upsprung weight of the airplane is known and is a constant, the weight voltage divider is adjusted to reflect the total weight of the airplane minus the unsprung weight.

In the weight calibration position, the voltage representing the unsprung weight is disconnected from the circuit. Then the variable resistance $R_{4a}$ is adjusted to get a null reading at the meter 40 in order to adjust the gain and hence the proportionality factor of amplifier 34. The adjustment of resistance $R_{4a}$ is also done very infrequently and then only when the instrument is being recalibrated or repaired. After resistance $R_{4a}$ is adjusted, the total weight of the airplane, including the unsprung weight, is adjusted into the voltage divider 36. The slider of the potentiometer $R_7$ is then adjusted to get a null reading and this introduces a correct factor for the unsprung weight.

To calibrate the percent MAC circuit shown in FIG. 5, the slider 66 of the variable resistance $R_{13}$ must first be adjusted. This is done by taking into consideration the fact that the voltage on slider 66 must be proportional to the nose unsprung weight. In the present circuit this adjustment is determined independently because the nose unsprung weight is a known constant for the particular airplane. Consequently, slider 66 may be adjusted by means of a volt meter connected across the resistance $R_{13}$ in a manner well known in the art.

After slider 66 is adjusted, the position of the sliding contact 54 is rotated to the percent MAC position of the six-position 9-stack switch. Then the percent MAC voltage divider is set to reflect the actual percent MAC. This value is also known at the time of calibration because as stated above the weight on the nose landing gear $W_{nt}$ and the total weight of the airplane $W_t$ are measured independently when the weight circuit is calibrated. From these factors, and using Equation 8 or using other means the percent MAC is known. This value is then adjusted into the percent MAC voltage divider. Then the resistance $R_{4b}$ of the summing amplifier 44 is adjusted so that meter 40 gives a null reading.

It is desirable to periodically check the circuit 48 to see if it is operating properly. To do this, transducers 26, 28 and 30 are each provided with a center tap 60, 62 and 64, see FIG. 7. At the weight check position each of these transducers will produce a voltage and the voltage divider 36 is adjusted so null meter 40 indicates a zero reading and the calibrations of the setting of the voltage meter under these circumstances is recorded. These voltages and the setting of the voltage divider 36 required to get a null reading on meter 40 are independent of the loading configuration of the airplane. With this arrangement the circuit can be tested to determine whether it is operating correctly by simply adjusting the slider 54 to the weight check position and then adjusting the voltage divider to the predetermined calibrated setting. If the meter 40 then indicates a null reading, the weight circuit is operating correctly. Similarly, when the sliders 54 are rotated to the percent MAC check position, the voltages at the center taps 60, 62 and 64 are fed into the percent MAC circuit 43 in FIG. 5. Then the percent MAC voltage divider 46 is adjusted to a zero position and the calibrated positions of the voltage divider are noted. This reading also is independent of the loading configuration of the airplane. Then later, when it is desired to check the percent MAC circuit, the sliders 54 are rotated to the percent MAC check position and the percent MAC voltage divider is adjusted to the predetermined above-noted setting. If a null reading is obtained or the deviations from a null reading are within permissible limits this provides an indication that the circuit is operating correctly.

Obviously many modifications and variations of the present invention are possible in the light of the above teachings. It is therefore to be understood that within the scope of the appended claims the invention can be practiced otherwise than as specifically described.

We claim:
1. A device for providing a direct indication of the percent MAC of an airplane having port and starboard landing gears and a third landing gear in longitudinally spaced relation to a line connecting said port and starboard landing gears, comprising a computing circuit for solving the equation

$$\frac{yW_t}{MAC} - \frac{LW_t}{MAC}\left(\frac{1-l}{L}\right) + \frac{L}{MAC}W_{nt} = 0$$

where:

L is the distance between the nose landing gear and the port and starboard landing gears, $W_t$ is the total weight of the airplane, $W_{nt}$ is the weight carried by the third landing gear, $l$ is the distance of the nose landing gear from the leading edge of the Mean Aerodynamic Chord, $y$ is the distance between the leading edge of the Mean Aerodynamic Chord, and the center of gravity of the airplane, MAC is the length of the Mean Aerodynamic Chord, and $$\frac{y}{MAC} \times 100$$

is the percent MAC, said computing circuit having three parts, the first part comprising an adjustable voltage multiplying means calibrated in terms of percent MAC for multiplying an input voltage by $$\frac{y}{MAC} \times 100$$

the second part comprises a second voltage multiplying means for multiplying an input voltage by the ratio $$\frac{L}{MAC}\left(\frac{1-l}{L}\right)$$

the third part comprises a third voltage multiplying means for multiplying an input voltage by the ratio $L/MAC$, the input voltage to said first part comprising a voltage proportional to $W_t$ whereby the output voltage of the first part is a voltage proportional to $$\frac{y}{MAC} \times 100 \times W_t$$

means in said second part for providing a voltage phase reversal and the input voltage to said second part comprising a voltage proportional to $W_t$ whereby the output voltage of said second part is a voltage proportional to $$\frac{-L}{MAC}W_t\left(\frac{1-l}{L}\right)$$

the input voltage to said third part comprising a voltage proportional to $W_{nt}$ whereby the output voltage of said third part is a voltage proportional to $$\frac{L}{MAC}W_{nt}$$

said computing circuit having a summing device, the output voltages of said three parts connected to the input of said summing device, the output of said summing device connected to a null meter whereby when the sum of said output voltages of said three parts is zero the calibrations on the adjustable voltage multiplying means indicates the percent MAC.

2. The device described in claim 1 wherein said computing circuit includes transducers built into the port and starboard landing gears and the third landing gear, a first summing device, the output of said transducers fed into said first summing device to obtain a voltage proportional to $W_t$, the output of the transducer built into the third landing gear providing a voltage proportional to $W_{nt}$.

3. The device described in claim 2 wherein the output of said first summing device is connected both to the input to said adjustable voltage multiplying means and to said second voltage multiplying means, the output of the transducer connected to the third landing gear connected to the input of the third voltage multiplying means.

4. The device described in claim 3 wherein said adjustable voltage multiplying means comprises a three branch voltage divider calibrated in terms of percent MAC, and said second and third voltage multiplying means are both summing amplifiers.

5. A device of the class described for use with an airplane having port and starboard landing gears and a third landing gear in longitudinally spaced relation to a line connecting said port and starboard landing gears comprising separate load transducers built into each of said landing gears for converting the load carried by said landing gears into separate electrical potentials, a first summing amplifier, the output of each transducer connected to the input of said first summing device to obtain a voltage proportional to the total weight of the airplane, an adjustable voltage divider calibrated in terms of the weight of the airplane for producing an adjustable voltage 180° out of phase with the voltage proportional to the weight of the airplane, a second summing amplifier, switch means having a plurality of positions, in one position of the switch the voltage proportional to the total weight of the airplane and the adjustable voltage output from the voltage divider connected to the input of the second summing amplifier, a null meter connected to the output of the second summing amplifier, whereby when the first voltage divider is adjusted so the null meter indicates the output of the second summing amplifier is zero, the calibrations on the first adjustable voltage divider indicates the total weight of the airplane.

6. The device described in claim 5 including a second adjustable voltage divider calibrated in terms of percent MAC, in one of the positions of said switch means the voltage proportional to the weight of the airplane comprising an input to the said second adjustable voltage divider to multiply the voltage proportional to the total weight of the airplane by a factor determined by the setting on said secod adjustable voltage divider, the output of said second adjustable voltage divider comprising an input to said second summing amplifier, said device producing additional voltages proportional to the weight carried by the third landing gear, said additional voltages serving as additional inputs to said second summing amplifier, said additional voltages related to the calibrations of said second adjustable voltage divider in such a way that when said second adjustable voltage divider is adjusted so the null meter indicates a zero output, the calibration on the second adjustable voltage divider directly indicated the percent MAC.

7. The device described in claim 5 including a computing circuit for solving the equation $$yW_t - LW_t\left(1 - \frac{l}{L}\right) + \frac{L}{MAC}W_{nt} = 0$$

where:

L is the distance between the nose landing gear and the port and starboard landing gears,
$W_t$ is the total weight of the airplane,
$W_{nt}$ is the weight carried by the third landing gear,
$l$ is the distance of the nose landing gear from the leading edge of the Mean Aerodynamic Chord,
$y$ is the distance between the leading edge of the Mean Aerodynamic Chord and the center of gravity of the airplane,
MAC is the length of the Mean Aerodynamic Chord, and $$\frac{y}{MAC} \times 100$$

is the percent MAC, said computing circuit having three parts, the first part comprising an adjustable voltage divider calibrated in terms of percent MAC for multiplying an input voltage by $$\frac{y}{MAC} \times 100$$

said voltage proportional to the weight of the airplane connected to the input of said second voltage divider, the second part comprising a third summing amplifier for multiplying an input voltage by the ratio $$\frac{L}{MAC}\left(1 - \frac{l}{L}\right)$$

the input voltage to said second part comprising a voltage proportional to the total weight of the airplane, the output voltage of said second part 180° out of phase with said first part, said third part comprising a fourth summing amplifier for multiplying an input voltage by the ratio $L/MAC$, the input voltage to said third part comprising a voltage proportional to the total weight carried by the third landing gear, the output voltage of all three parts connected to the input of said second summing amplifier in another position of the switch whereby when the second adjustable voltage divider is adjusted to provide a zero output on the null meter the calibrations on the second summing amplifier provide a direct indication of the percent MAC.

8. The device described in claim 7 wherein said switch has a third position, said computing circuit connected to said switch means in such a way that when said switch means is in said third position the input to each summing amplifier is zero whereby each summing amplifier can be adjusted to have a zero output when there is a zero input.

9. The device described in claim 8 wherein each of the transducers built into the landing gears has a center tap, said switch having a fourth position, in said fourth position the center tap voltages of the transducers connected to the input of said first summing device whereby if said adjustable voltage divider calibrated in terms of percent MAC is adjusted to provide a zero reading on the null meter, the calibrations on the voltage divider required to provide this zero reading will be independent of the loading configuration of the airplane, thereby providing a means for determining the performance of the computing circuit.

10. The device described in claim 5 wherein each of the transducers built into the landing gears have a center tap, said switch having another position, in said other position the center tap voltages of the transducers are connected to the input of the first summing amplifier whereby if said adjustable voltage divider calibrated in terms of weight is adjusted to provide a zero reading on the null meter, the calibrations on the voltage divider required to provide this zero reading will be independent of the loading configuration of the air plane thereby providing a means for determining the performance of the device.

References Cited

UNITED STATES PATENTS

| | | | |
|---|---|---|---|
| Re. 23,945 | 2/1955 | Kolisch | 235—150.2 |
| 2,540,807 | 2/1951 | Berry | 73—65 |
| 2,559,718 | 7/1951 | Goodlett et al. | 235—150.2 X |
| 2,686,426 | 8/1954 | Kolisch | 73—65 |
| 2,725,193 | 11/1955 | Kolisch | 235—150.2 |
| 3,063,638 | 11/1962 | Kolisch | 235—150.2 |

EUGENE G. BOTZ, Primary Examiner

R. W. WEIG, Assistant Examiner

U.S. Cl. X.R.

73—65